(12) United States Patent
Kim et al.

(10) Patent No.: US 7,122,271 B2
(45) Date of Patent: Oct. 17, 2006

(54) BATTERY UNIT AND LITHIUM SECONDARY BATTERY EMPLOYING THE SAME

(75) Inventors: Joong-Hun Kim, Cheonan-si (KR); Hyung Bok Lee, Seoul (KR); Hyun-Jei Chung, Cheonan-si (KR); Tae-Shik Earmme, Seoul (KR); Wook-Kyu Kang, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 366 days.

(21) Appl. No.: 10/756,390

(22) Filed: Jan. 14, 2004

(65) Prior Publication Data

US 2004/0142236 A1 Jul. 22, 2004

(30) Foreign Application Priority Data

Jan. 18, 2003 (KR) .................... 10-2003-0003468

(51) Int. Cl.
*H01M 4/00* (2006.01)
*H01M 6/10* (2006.01)

(52) U.S. Cl. .......................... 429/66; 429/94

(58) Field of Classification Search ............... 429/94, 429/130, 144, 142, 66
See application file for complete search history.

(56) References Cited

U.S. PATENT DOCUMENTS

| 4,707,421 | A | * | 11/1987 | McVeigh et al. | ............. 429/94 |
| 6,391,491 | B1 | | 5/2002 | Kim | ............. 429/178 |
| 6,497,980 | B1 | | 12/2002 | Hwang et al. | ............. 429/332 |

* cited by examiner

*Primary Examiner*—Patrick Joseph Ryan
*Assistant Examiner*—Thomas H. Parsons
(74) *Attorney, Agent, or Firm*—Stein, McEwen & Bui, LLP

(57) ABSTRACT

A battery unit including an electrode unit including a positive electrode plate, a separator, and a negative electrode plate, wherein the positive electrode plate, the separator, and the negative electrode plate are disposed in sequential order; electrode leads extending from each of the positive and negative electrode plates of the electrode unit; and a finishing tape provided on an outermost surface of the electrode unit, including an adhesive layer having a low adhesive strength, and a polymer film layer coated with the adhesive layer, wherein the finishing tape is detachably attached to the electrode unit so as to detach in response to the electrode unit deforming.

10 Claims, 5 Drawing Sheets

BATTERY UNIT AND LITHIUM SECONDARY BATTERY EMPLOYING THE SAME

CROSS-REFERENCE TO RELATED APPLICATIONS

This application claims the benefit of Korean Patent Application No. 2003-3468, filed on Jan. 18, 2003 in the Korean Intellectual Property Office, the disclosure of which is incorporated herein by reference.

BACKGROUND OF THE INVENTION

1. Field of the Invention

The present invention relates to a lithium secondary battery, and, more particularly, to a battery unit having an improved structure capable of suppressing distortion of an electrode unit, and a lithium secondary battery employing the same.

2. Description of the Related Art

With the development of portable electronic devices such as cellular phones, notebook-type computers, camcorders, and the like, there has been increased research into secondary batteries that are generally capable of charging and discharging. Lithium batteries are classified into nickel-cadmium (Ni—Cd) batteries, nickel-hydride (Ni-MH) batteries, and lithium secondary batteries. Specifically, the lithium secondary batteries are being rapidly developed in view of their high operating voltage of 3.6 V or higher, which is approximately 3 times that of the nickel-cadmium (Ni—Cd) batteries or nickel-hydride (Ni-MH) batteries, and their excellent energy density per unit weight.

The lithium secondary batteries may be classified into liquid electrolyte batteries and solid electrolyte batteries, according to the electrolyte used. In general, batteries using a liquid electrolyte are referred to as lithium-ion batteries, and batteries using a polymeric electrolyte are referred to as lithium polymer batteries.

The lithium secondary batteries may be manufactured in various shapes, and are typically in cylindrical and rectangular shapes. Lithium polymer batteries, which have been given much attention recently, are manufactured in a flexible pouch shape so that they are relatively free in view of shape design. Also, lithium polymer secondary batteries, having excellent safety characteristics and being light in weight, are advantageous in attaining miniaturized and lightweight portable electronic apparatuses.

Pouch-type lithium secondary batteries are disclosed in U.S. Pat. Nos. 6,391,491 and 6,497,980.

FIG. 1 shows a conventional pouch-type lithium secondary battery 10. Referring to FIG. 1, the lithium secondary battery 10 includes an electrode unit 11 and a case 12. A space 12a, in which the electrode unit 11 is accommodated, is provided in the case 12.

The electrode unit 11 includes, although these elements are not shown, a positive electrode plate, a negative electrode plate, and a separator interposed therebetween. In a state in which the positive electrode plate, the separator, and the negative electrode plate are stacked in that order, the stacked structure is wound in a jelly-roll type structure.

Unlike in the cylindrical or rectangular lithium secondary battery, which are formed of a thick metal plate, the case 12 is formed of a thin metal foil and an insulating film laminated on both surfaces of the metal foil in a pouch type structure. A space 12a, in which the electrode unit 11 is accommodated, is provided in the case 12, and a sealing surface 12b is provided along the periphery of the space 12a for thermal fusion.

Ends of positive and negative electrode leads 13 and 14, which are electrically connected to respective electrode plates of the electrode unit 11, extend outside the sealing surface 12b. An insulating tape 15 is wrapped around a contact portion of the positive and negative electrode leads 13 and 14 and the sealing surface 12b.

FIG. 2 is a perspective view of the electrode unit 11 shown in FIG. 1. Referring to FIG. 2, the electrode unit 11 is formed by winding a laminate structure in which the positive electrode plate, the separator, and the negative electrode plate are sequentially disposed in that order. The positive and negative electrode leads 13 and 14 extend outside the electrode unit 11 to be connected to external terminals. The insulating tape 15 is wrapped around the positive and negative electrode leads 13 and 14, An insulating member 21 is wrapped around the outermost surface of the jelly-roll type electrode unit 11 in order to prevent the electrode unit 11 from being unwound due to its intrinsic restoring force. The insulating member 21 covers the electrode unit 11, including a winding completion portion 11a wrapped around the outer surface of the electrode unit 11, so that the shape of the electrode unit 11 is retained.

Next, the electrode unit 11 is mounted in the space 12a of the case, and the sealing surface 12b formed along the periphery of the space 12a is sealed by being thermally fused. Then, the positive and negative electrode leads 13 and 14 extending outside the case 12 are electrically connected to terminals of a protection circuit board mounted on an outer surface of the case 12.

However, the conventional lithium secondary battery 10 has some significant problems. When winding the electrode unit 11 in a state in which electrode plates having opposite polarities and a separator interposed therebetween are sequentially disposed, different tensions are applied to the respective components of the electrode unit 11 as the winding proceeds. That is, the tension applied to the positive electrode plate, the negative electrode plate and the separator is not uniform.

In such a state, if there is a change in the thickness of an electrode plate during electrolyte injection or charging/discharging, the electrode unit 11, which has a restoring force itself, deforms to restore a stable structure that can minimize the tension applied thereto.

However, since the electrode unit 11 is supported by the insulating member 21 so as to prevent positional deformation, it cannot deform freely, resulting in distortion, as indicated by a dotted line shown in FIG. 2.

SUMMARY OF THE INVENTION

The present invention provides a battery unit having an improved structure capable of suppressing distortion of an electrode unit, and a lithium secondary battery employing the same.

Additional aspects and/or advantages of the invention will be set forth in part in the description which follows and, in part, will be obvious from the description, or may be learned by practice of the invention.

According to an aspect of the present invention, there is provided a battery unit comprising battery unit comprising an electrode unit comprising a positive electrode plate, a separator, and a negative electrode plate, wherein the positive electrode plate, the separator, and the negative electrode plate are disposed in sequential order; electrode leads extending from each of the positive and negative electrode plates of the electrode unit; and a finishing tape provided on an outermost surface of the electrode unit, comprising an adhesive layer having a low adhesive strength, and a polymer film layer coated with the adhesive layer, wherein the finishing tape is detachably attached to the electrode unit so as to detach in response to the electrode unit deforming.

According to another aspect of the invention, there is provided a lithium secondary battery comprising an electrode unit comprising a positive electrode plate, a separator, and a negative electrode plate, wherein the positive electrode plate, the separator, and the negative electrode plate are disposed in sequential order; electrode leads extending from each of the positive and negative electrode plates of the electrode unit; a finishing tape provided on an outermost surface of the electrode unit, comprising an adhesive layer having a low adhesive strength, and a polymer film layer coated with the adhesive layer, wherein the finishing tape is detachably attached to the electrode unit so as to detach in response to the electrode unit deforming; and a case providing a space in which the electrode unit is accommodated, and having a sealing surface thermally fused along the periphery of the space.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
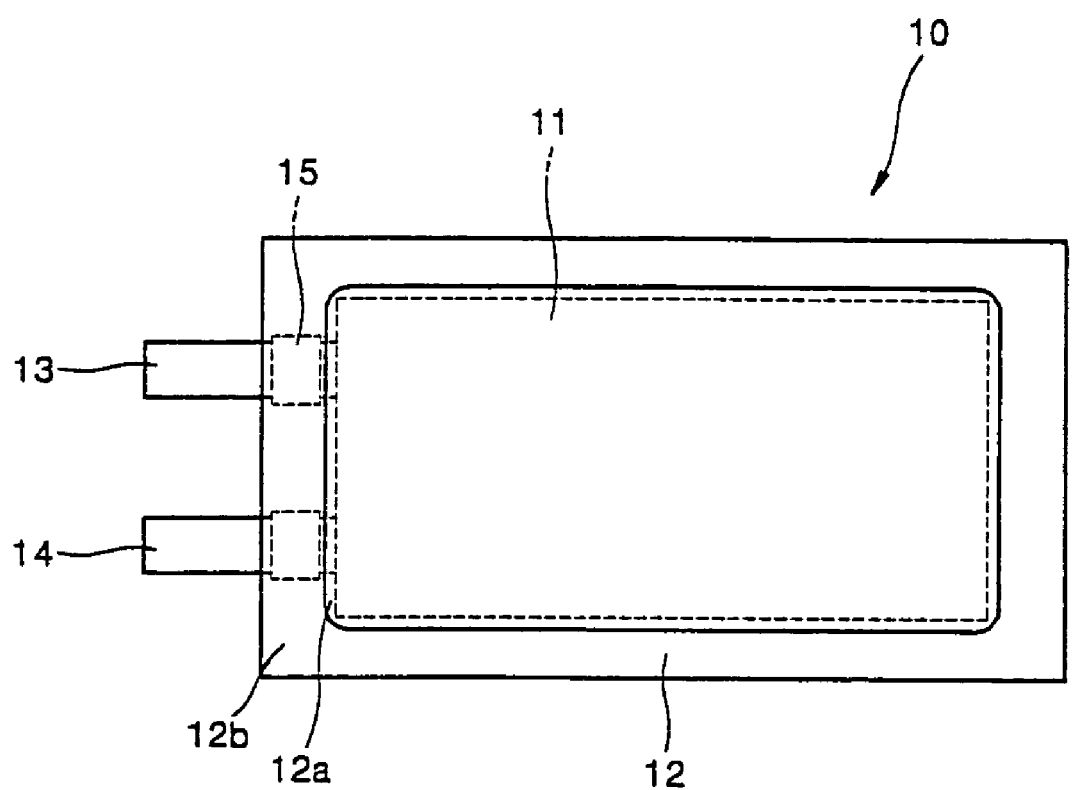
FIG. 1 is a plan view of a conventional lithium secondary battery.
Figure 2:
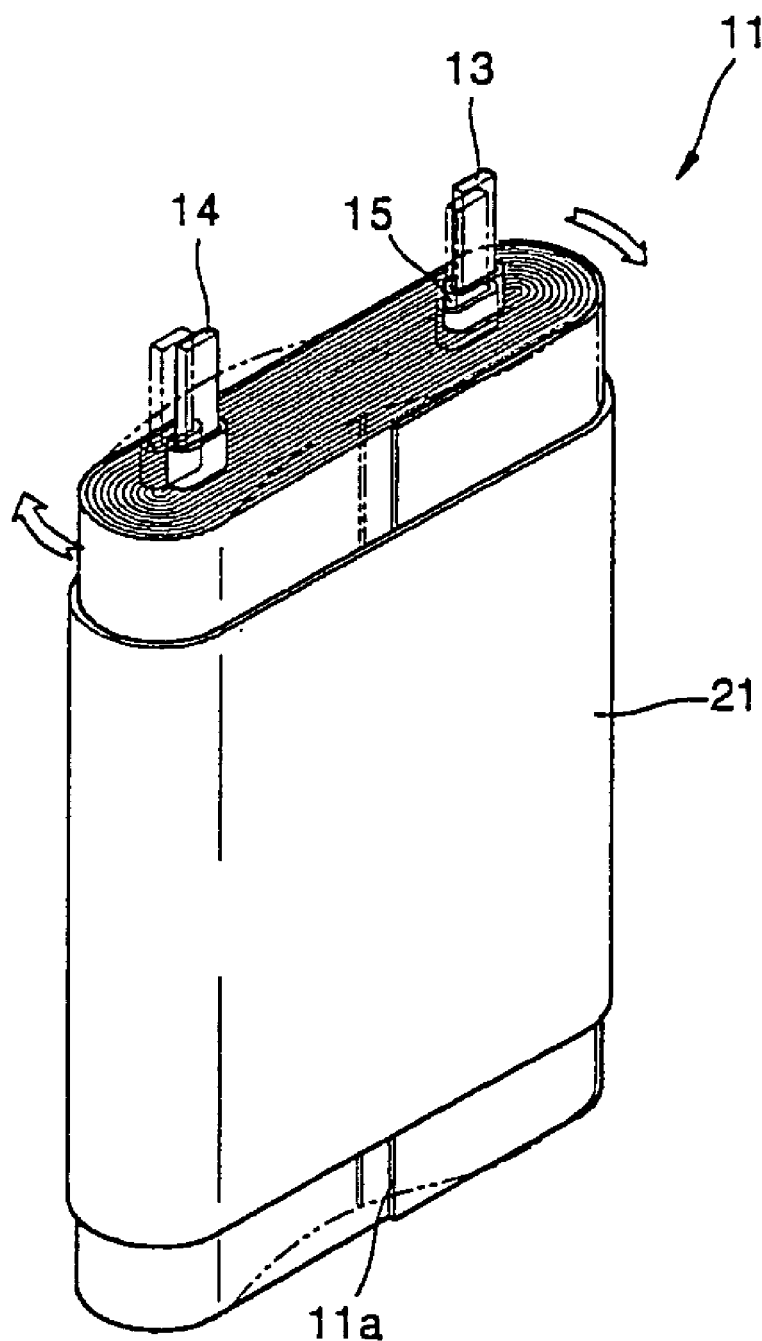
FIG. 2 is a perspective view of a state in which the lithium secondary battery shown in FIG. 1 deforms.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
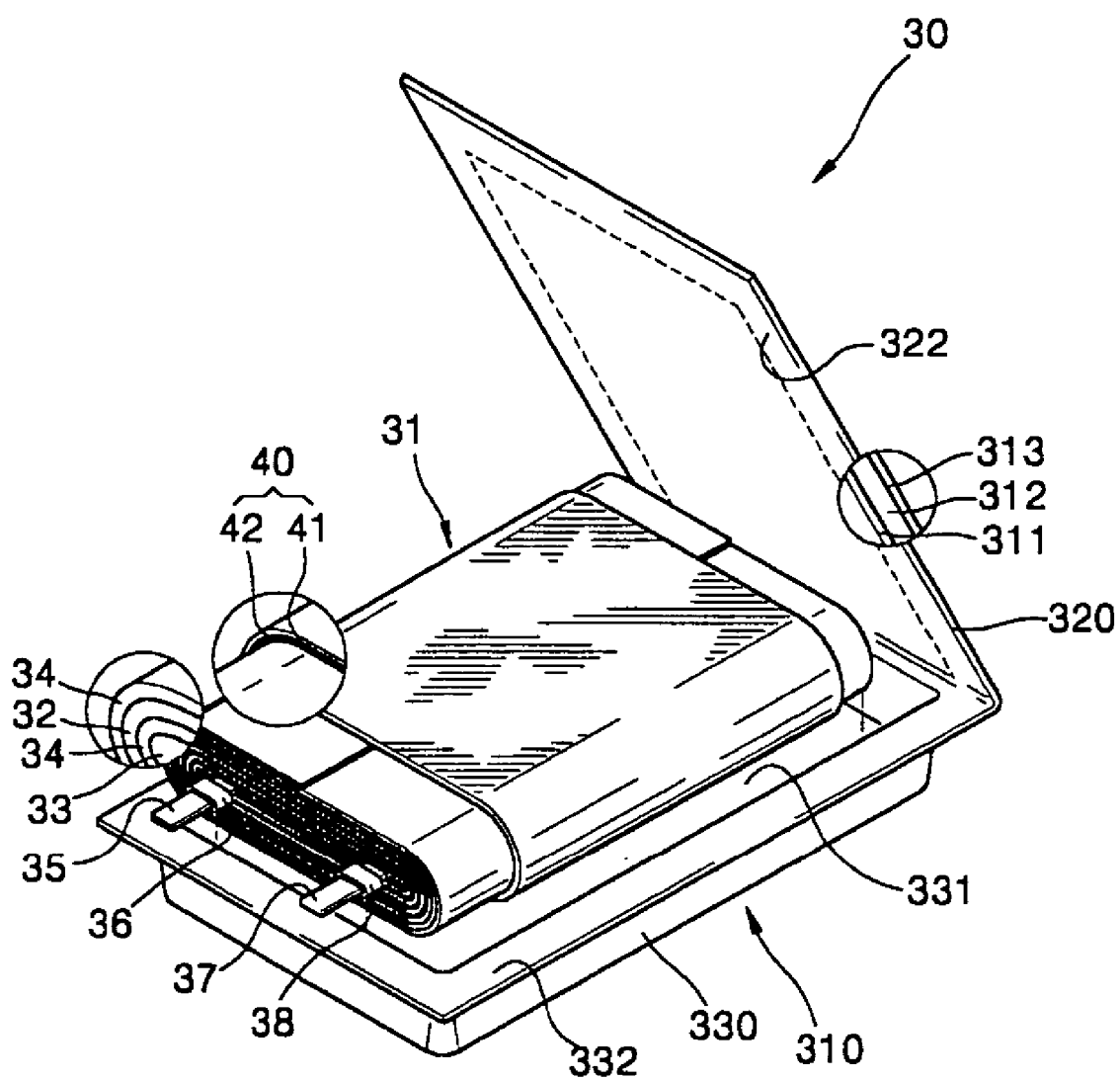
FIG. 3 is a perspective view of a lithium secondary battery according to an embodiment of the present invention.

FIG. 3 shows a lithium secondary battery 30 according to an embodiment of the present invention.

Referring to FIG. 3, the lithium secondary battery 30 includes an electrode unit 31, and a case 310 accommodating the electrode unit 31.

The electrode unit 31 includes a positive electrode plate 32, a negative electrode plate 33 and a separator 34 interposed therebetween.

The positive electrode plate 32 has a positive electrode active material layer composed of a lithium-based oxide as a main component, a binder, a plasticizer, a conductive agent and the like, coated on a positive electrode current collector formed of a strip-shaped metal foil, e.g., an aluminum foil. A positive electrode lead 35 is drawn ouf from the positive electrode plate 32. A positive electrode insulating tape 36 is wrapped around a portion where the positive electrode lead 35 is drawn out from the positive electrode plate 32.

The negative electrode plate 33 has a negative electrode active material layer composed of a carbon material as a main component, a binder, a plasticizer, a conductive agent, and the like, coated on a negative electrode current collector formed of a strip-shaped metal foil, e.g., a copper foil. A negative electrode lead 37 is drawn out from the negative electrode plate 33. A negative electrode insulating tape 38 is wrapped around a portion where the negative electrode lead 37 is drawn out from the negative electrode plate 33.

At least one sheet of the separator 34 is disposed between the positive electrode plate 32 and the negative electrode plate 33 for insulation therebetween. The separator 34 is made of polyethylene, polypropylene, or a copolymer of polyethylene and polypropylene. In order to prevent a short-circuit between the positive and negative electrode plates 32 and 33, it is beneficial that the separator 34 is wider than the positive or negative electrode plate 32, 33.

The case 310 includes an upper case body 320 and a lower case body 330 coupled to the upper case body 320. The upper and lower case bodies 320 and 330 are integrally welded to each other along at least one periphery.

A space 331 in which the electrode unit 31 is accommodated is provided at the lower case body 330. A lower sealing surface 332 is formed along the periphery of the space 331. An upper sealing surface 322 is formed at a portion of the upper case body 320, the portion corresponding to the lower sealing surface 332, the upper sealing surface 322 formed to contact the lower sealing surface 332, thus providing a sealing surface. After the electrode unit 31 is accommodated in the space 331 of the case 310, the upper and lower sealing surfaces 322 and 332 are sealed to each other by thermal fusion.

The upper and lower case bodies 320 and 330 are preferably, but not necessarily, formed of substantially the same material, and are constructed of multiple layers including an inner coating 311 made of a polymeric insulating layer, a medium layer 312 made of a metal foil to maintain formability, and an outer coating 313 made of a polymeric insulating layer.

The electrode unit 31 having the above-described structure can be wound in a state in which the positive electrode plate 32, the separator 34, and the negative electrode plate 33 are disposed sequentially in that order, that is, in a jelly-roll type structure.

The wound electrode unit 31 is accommodated in the space 331. Here, edges of the positive and negative electrode leads 36 and 37 drawn out from the respective electrode plates 32 and 33 of the electrode unit 31 extend outside the closed case 310.

In order to allow the electrode unit 31 to be deformable during injection of electrolyte or charging/discharging, a separable finishing tape 40 is provided on the outer surface of the electrode unit 31. The finishing tape 40 includes a film layer 41 made of a polymer resin, and an adhesive layer 42 having a low adhesive strength, which will now be described in more detail.

Figure 4:
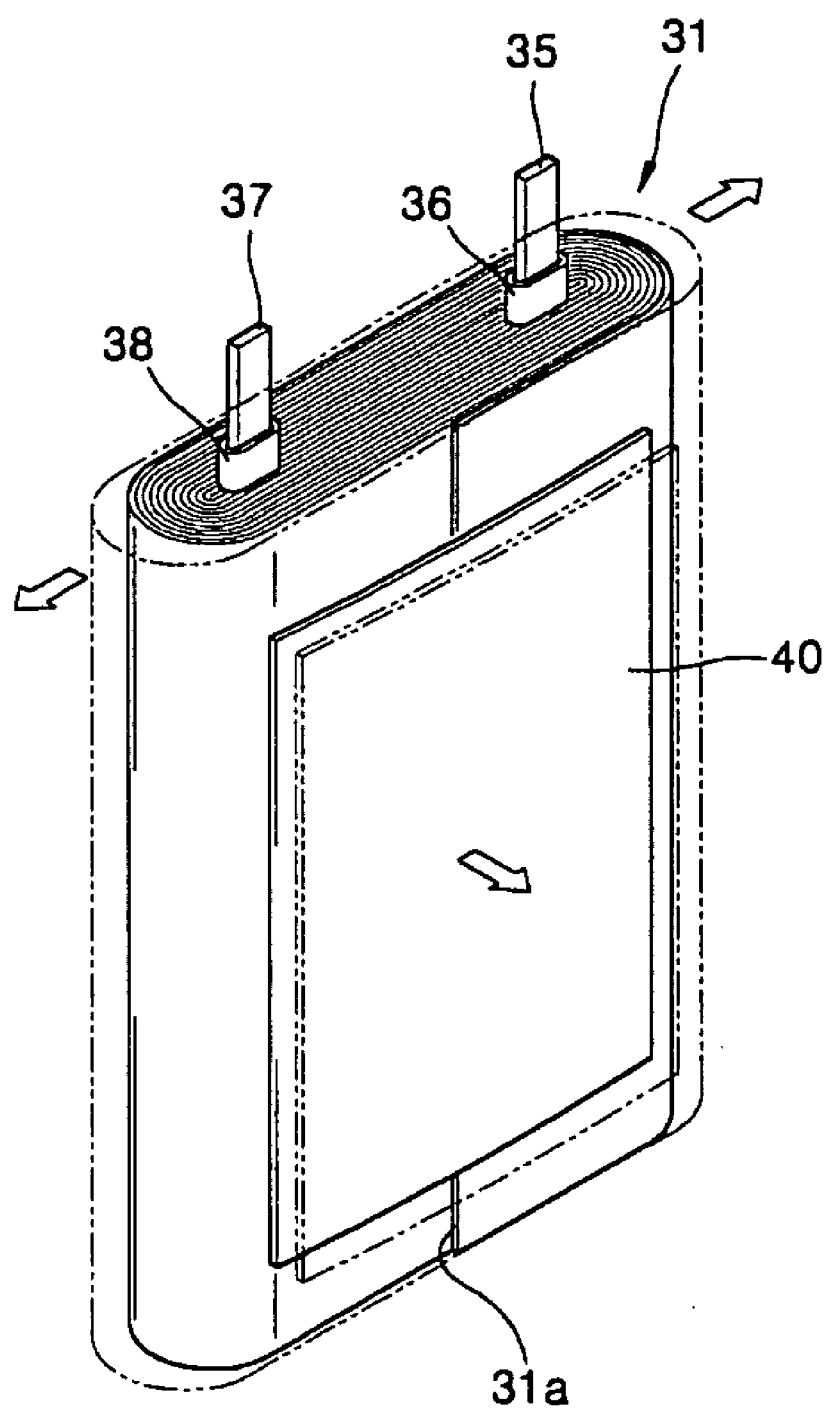
FIG. 4 is a perspective view of a state in which the lithium secondary battery shown in FIG. 3 deforms.
Figure 5:
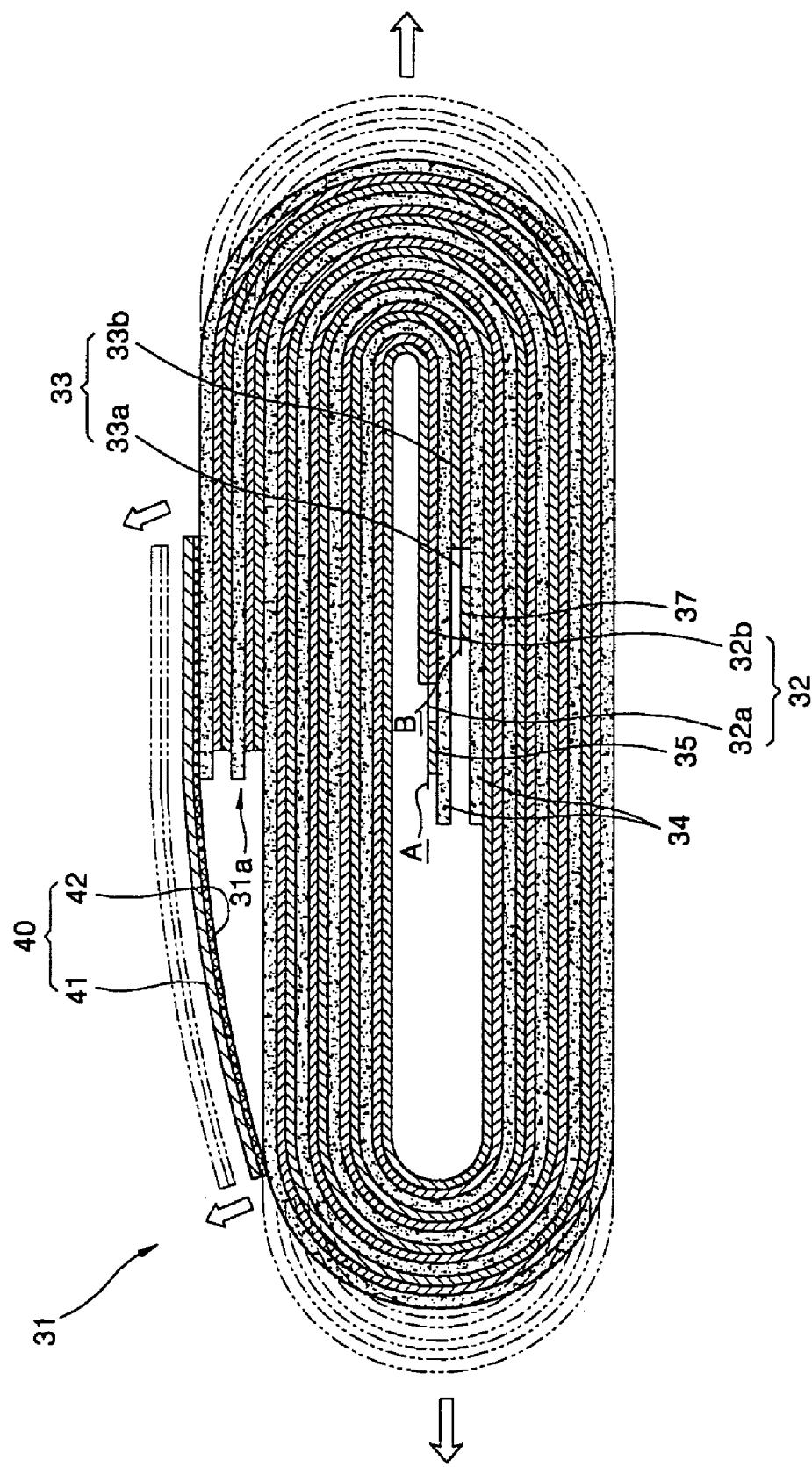
FIG. 5 is a cross-sectional view of FIG. 4.

FIG. 4 shows the electrode unit 31 shown in FIG. 3, and FIG. 5 is a cross-sectional view of the electrode unit 31 of FIG. 4, in which the same reference numerals of the foregoing drawings denote the same functional elements.

Referring to FIGS. 4 and 5, a positive electrode plate 32 has a positive electrode active material layer 32b coated on both surfaces of a positive electrode current collector 32a, and a positive electrode lead 35 is electrically welded to a region A of the positive electrode current collector 32a, the region A not being coated with the positive electrode active material layer 32b.

A separator 34 is disposed on an outer surface of the positive electrode plate 32.

A negative electrode plate 33 is disposed on the surface of the separator 34 opposed to the surface facing the positive electrode plate 32. The negative electrode plate 33 has a negative electrode active material layer 33b coated on both surfaces of a negative electrode current collector 33a, and a negative electrode lead 37 is electrically welded to a region B of the negative electrode current collector 33a, the region B not being coated with the negative electrode active material layer 33b.

Another separator 34 is disposed on an outer surface of the negative electrode plate 33.

In such a manner, the electrode unit 31 is wound by applying a predetermined tension thereto in a state in which the positive electrode plate 32, the separator 34, the negative electrode plate 34, and another separator 34 are sequentially disposed, and a cross section thereof is substantially elliptically shaped.

In order to prevent the electrode unit 31 from being unwound due to its intrinsic restoring force, a finishing tape 40 is wrapped around the outermost surface of the electrode unit 31. The finishing tape 40 covers a winding completion portion 31a of the electrode unit 31.

The finishing tape 40 is made of a material having a low adhesive strength so as to be easily separated from the electrode unit 31 in the event of deformation of the electrode unit 31. That is, the finishing tape 40 includes a polymer film layer 41 and an adhesive layer 42. The polymer film layer 41 is made of a polymer resin, such as polyethylene, polystyrene, polypropylene, or polyethyleneterephthalate (PET). The adhesive layer 42, made of a material having a low adhesive strength, is coated on the inner surface of the polymer film layer 41.

The adhesive layer 42 is preferably made of a material having a low adhesive strength of 500 g/25 mm or less, e.g., an acryl-based adhesive. The polymer film layer 41. coated with the adhesive layer 42 having a low adhesive strength, can be separated from the electrode unit 31 when the electrode unit 31 deforms.

The electrode unit 31 having the aforementioned finishing tape 40 operates as follows.

The electrode unit 31 is accommodated in a pouch-shaped case (310 of FIG. 3) and sealed. For stabilizing the sealed lithium secondary battery 30, charging and discharging are performed.

As described above, the electrode unit 31 is wound and a predetermined tension is applied thereto in one direction, and the finishing tape 40, having the polymer film layer 41 coated with the adhesive layer 42, is wrapped around the outer surface of the electrode unit 31, including the winding completion portion 31a, in order to prevent the electrode unit 31 from being unwound due to its intrinsic restoring force. The adhesion of the finishing tap 40 is minimized by an electrolytic solution present in the case 310, and is detachably provided on the outer surface of the electrode unit 31.

Accordingly, if the electrode unit 31 deforms in a direction in which tension, applied when a thickness of each electrode plate changes during charging and discharging, as shown by a dashed line in FIG. 5, is minimized, the finishing tape 40 is temporarily separated from the outer surface of the electrode unit 31 as indicated by arrows shown in FIG. 5.

As a result, the electrode unit 31 is freely deformable in a direction in which tension applied thereto is minimized, thereby avoiding distortion. This is possible because the finishing tape 40 has a low adhesive strength so that it is not firmly adhered to the outer surface of the electrode unit 31. Later on, when the electrode unit 31 restores to its original shape due to its intrinsic restoring force, that is, when the electrode unit 31 moves in a direction opposite to the direction indicated by the arrows in FIG. 5, the finishing tape 40 can be attached again to the outer surface of the electrode unit 31.

As described above, in a jelly-roll type structure electrode unit and a lithium secondary battery employing the same according to the present invention, since a finishing tape wrapping around an outer surface of the jelly-roll type electrode unit is made of a material having a low adhesive strength, it is temporarily detached from the electrode unit in the event of deformation of the electrode unit during charging and discharging. Accordingly, the electrode unit is freely deformable, thereby avoiding distortion.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A battery unit comprising:
   an electrode unit comprising:
      a positive electrode plate,
      a separator, and
      a negative electrode plate,
      wherein the positive electrode plate, the separator, and the negative electrode plate are disposed in sequential order;
   electrode leads extending from each of the positive and negative electrode plates of the electrode unit; and
   a finishing tape provided on an outermost surface of the electrode unit, comprising:
      an adhesive layer having a low adhesive strength, and
      a polymer film layer coated with the adhesive layer,
      wherein the finishing tape is detachably attached to the electrode unit so as to detach in response to the electrode unit deforming.

2. The battery unit of claim 1, wherein the electrode unit is wound in a jelly-roll type structure.

3. The battery unit of claim 1, wherein the polymer film layer comprises at least one selected from the group consisting of polyethylene, polystyrene, polypropylene and polyethyleneterephthalate (PET).

4. The battery unit of claim 1, wherein the adhesive layer has an adhesive strength of 500 g/25 mm or less.

5. The battery unit of claim 1, wherein the adhesive layer comprises an acryl-based adhesive.

6. A lithium secondary battery comprising:
   an electrode unit comprising:
      a positive electrode plate,
      a separator, and
      a negative electrode plate,
      wherein the positive electrode plate, the separator, and the negative electrode plate are disposed in sequential order;
   electrode leads extending from each of the positive and negative electrode plates of the electrode unit;
   a finishing tape provided on an outermost surface of the electrode unit, comprising:
      an adhesive layer having a low adhesive strength, and
      a polymer film layer coated with the adhesive layer,
      wherein the finishing tape is detachably attached to the electrode unit so as to detach in response to the electrode unit deforming; and a case providing a space in which the electrode unit is accommodated, and having a sealing surface thermally fused along the periphery of the space.

7. The lithium secondary battery of claim 6, wherein the electrode unit is wound in a jelly-roll type structure.

8. The lithium secondary battery of claim 6, wherein the polymer film layer comprises at least one selected from the group consisting of polyethylene, polystyrene, polypropylene and polyethyleneterephthalate (PET).

9. The lithium secondary battery of claim 6, wherein the adhesive layer comprises an acryl-based adhesive.

10. The lithium secondary battery of claim 6, wherein the adhesive layer has an adhesive strength of 500 g/25 mm or less so that the adhesive layer is temporarily separated from the outermost surface of the electrode unit in response to the electrode unit deforming, and is attached again to the outermost surface of the electrode unit in response to the electrode unit returning to an original shape of the electrode unit.

* * * * *